United States Patent [19]
Woodward et al.

[11] 4,184,630
[45] Jan. 22, 1980

[54] VERIFYING CIRCUIT OPERATION

[75] Inventors: Donald R. Woodward, Northglenn; John W. Marshall, Boulder, both of Colo.

[73] Assignee: International Business Machines Corporation, Armonk, N.Y.

[21] Appl. No.: 916,659

[22] Filed: Jun. 19, 1978

[51] Int. Cl.² ............................................. G06F 11/00
[52] U.S. Cl. ................................................. 235/302.4
[58] Field of Search ............................. 235/302, 302.4; 340/146.1 AL

[56] References Cited

U.S. PATENT DOCUMENTS

| | | | |
|---|---|---|---|
| 3,405,258 | 10/1968 | Godoy et al. | 235/302.4 |
| 3,465,132 | 9/1969 | Crockett et al. | 235/302.4 |
| 3,582,633 | 6/1971 | Webb | 235/302 |
| 3,919,533 | 11/1975 | Einolf, Jr. et al. | 235/302 |
| 4,048,481 | 9/1977 | Bailey, Jr. et al. | 235/302.4 |
| 4,070,565 | 1/1978 | Borrelli | 235/302 |

Primary Examiner—Charles E. Atkinson
Attorney, Agent, or Firm—Herbert F. Somermeyer

[57] ABSTRACT

A polynomial based apparatus, such as an error correcting apparatus, is checked by repeatedly supplying test bits to the apparatus. On even cycles, the modulo two sum of the signal contents should be zero, while on odd cycles it should be equal to the pattern used for test purposes.

7 Claims, 2 Drawing Figures

VERIFYING CIRCUIT OPERATION

BACKGROUND OF THE INVENTION

Error correction apparatus have been used for years in connection with data processing equipment, particularly in the memory and storage area. As error correction requirements have increased, the complexity of the error detection and correcting apparatus have correspondingly increased. It is possible, even though remotely, that an error condition can occur in the error correcting apparatus; therefore, a quick and certain way of checking the very complex error correcting matrices and apparatus is desired.

SUMMARY OF THE INVENTION

The invention provides apparatus and methods testing logic apparatus embodying a polynomial equation as a design base. The method comprises repeatedly supplying a given set of test bits to the apparatus. Upon predetermined ones of the repeated supply of test bits, the signal content of the logic apparatus is extracted. For even-numbered repetitions, the extracted signals from the entirety of the apparatus should have a modulo two sum of zero, while on odd-numbered repetitions, the modulo two sum should be equal to the test bit pattern. Failure of the checks signify an error condition in the apparatus. For a comprehensive check the signal content extraction should be on each repetition. Various apparatus can be used to implement the method.

THE DRAWING

DETAILED DESCRIPTION

Figure 1:
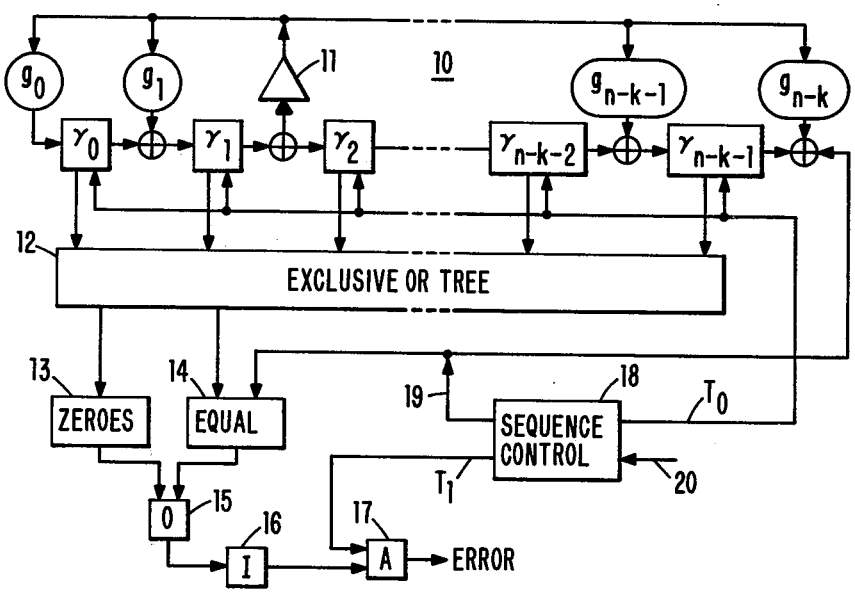
FIG. 1 is a diagramatic showing of a generalized version of the invention.

The present invention is initially described with reference to FIG. 1, a generalized block diagram of one form of test apparatus according to the invention. FIG. 1 shows the logic block to be tested as if it formed part of the testing apparatus, which is logically true when a test is being performed. The connections for data processing are omitted for clarity. Although this embodiment is included mainly for the purposes of explanation, its component blocks are individually conventional and one skilled in the art would be able to construct such apparatus from the present teaching.

The apparatus of FIG. 1 comprises an encoder 10 of the kind shown in FIG. 8.2 of *Error-Correcting Codes* (Second Edition) by Peterson and Weldon published by MIT Press for which the data element is a word and in which the logic circuit to be tested replaces the ($g_2$) feedback path logic and the feedback path gate is omitted (merely because its function is not used). The shift register stages $\gamma_0$ to $\gamma_{n-k-1}$ are connected, in addition, to an Exclusive OR (XOR) tree 12, the output of which is connected to a pair of detectors 13, 14. Detector 13 detects ALL ZERO and detector 14, which receives an additional input in common with the encoder 10, detects equality between its two inputs. The outputs of the detectors 13, 14 are fed to an OR circuit 15 connected via an INVERT circuit 16 to one input of an AND circuit 17, the output of which, when significant, indicates ERROR. A sequence control unit 18 is connected throughout the circuitry to control the operation of the same, though only three of its connections are shown, namely, its data input bus 19 to the encoder 10 and detector 14 and its timing lines $T_o$, controlling the shifting within the encoder 10, and $T_1$, applied as the second input to AND circuit 17. Control unit 18 is activated by a diagnostic initiate signal on line 20. No greater detail of the circuitry is given at this stage because the circuitry is generalized, specific detailed embodiments being set forth later.

The operation of the circuit is simple and is as follows:

(a) the control unit 18 is rendered operative by a signal on line 20 and cycles (such as by a ring counter) until the signal is removed.

(b) in the first part of each cycle a word D is entered into the encoder via input bus 19 at time $T_o$ at which the shift stages $\gamma_0$ to $\gamma_{n-k-1}$ are stepped and additionally their contents are entered into EXCLUSIVE OR (XOR) tree 12.

(c) in the second part of each cycle, after sufficient time has elapsed for logic elements 12 to 16 to have functioned, a signal $T_1$ enables AND circuit 17 and, if appropriate, an ERROR signal is emitted.

The constraints on the apparatus and logic circuits that can be tested thereby will become apparent from the following explanation of the theory of the apparatus, as we understand it. As is made clear in the reference, the encoder is a circuit which divides the total input regarded as a polynominal, in this case $$F(X) = \sum_{i=N-K}^{i=L} DX^i, \text{ by a polynomial } G(X) = \sum_{j=0}^{j=N-K} g_j X^j,$$

the remainder at any stage being a polynominal $$R(X) = \sum_{p=0}^{p=N-K-1} l_p X^p \text{ where } l_p \text{ is the content of shift}$$

register stage $l_p$ at that time. It follows that the output of the XOR tree is the XOR function ($\gamma_0 \oplus \gamma_1 \oplus \gamma_2 \oplus \cdots \oplus \gamma_{N-K-1}$) which is, in general, arbitrary. If, however, $G(X)=(X+1)(X+\alpha)(X+\alpha^2)\cdots(X+\alpha^{n-K-2})$ and there is no malfunction, the XOR function is alternately D and ZERO. The reason for this is that in the expansion of $G(X)$, each term appears in two coefficients $$\cdots (\cdots + \alpha^\Theta +) X^1 \cdots (\cdots + 1.\alpha^\Theta + \cdots) X^2 \cdots$$

$$\cdots (\cdots + \alpha^\oplus \alpha^\phi) X^i \cdots (\cdots + 1.\alpha^\oplus \alpha^\phi + \cdots) X^j$$

and so on. Since the "1" coefficient of $X^{n-k-1}$ is not contained in the shift register, the "1" appearing occuring in the coefficient of $X^{n-k-2}$ will be the only "1" occuring in the XOR sum. Thus, the XOR function of the coefficients is 1 and the XOR function of the complements of the coefficients is also 1. When the first term D is entered into the encoder, it appears to the encoder as $DX^{N-K}$ and, since this is divisible by $G(X)$, the register stages $\gamma_0$ to $\gamma_{n-k-1}$ will contain the coefficients of the corresponding power of X in $D(X^{N-K}-G(X))$. Thus, when the XOR function of these terms is formed it will be D as the effect of the X terms is removed. When the next term is entered, it will appear to the encoder as $X.DX^{N-K}$, providing an additional remainder $XD(X^{N-K}-G(X))$ which, on generating the XOR function, will individually produce D and thus the composite function will be $D \oplus D = O$. The entry of the next D term into the encoder will produce an output from the XOR tree of $D \oplus D \oplus D = D$ and so on. Thus, if there is no malfunction alternate outputs will be D,O,D,O and so on. Circuits 13 to 17 test for these conditions, so that if, at test time $T_1$, the output of XOR tree 12 is neither D nor ZERO, an error signal will be generated.

Since X in the preceding explanation is not normally a single bit but rather a sequence of bits in parallel, (i.e. a byte, a halfword, a word), the coefficients of the various polynomials are elements in the Galois Field $GF(p^q)$ where p is the number of significant states of each bit and q is the number of significant bits in each data element and D, the input, is one element of the field. Since XOR logic is used, no significance is paid to + and − in the arithmetic and the associative and distributive laws governing arithmetic in the fields permits the separated consideration of the inputs to the encoder. $\alpha$ is also an element in the field and it is believed to be necessary that it be a primitive element.

Thus, a logic circuit can be tested by such apparatus if its correct operation can be stated completely by an equation $O = T \cdot I$ where O,T,I are elements of a Galois field and O is the output I is the input and T is a fixed operator or transfer function which can be defined by the sum of the products of 1 and an unbroken monotonic increasing sequence of consecutive powers of a primitive element of the field. Frequently it will be possible to test more than one such logic circuit concurrently by plural substitution. If the circuitry of U.S. Pat. No. 3,629,824 is considered the code generators are already linked by such a relationship in that one logic block replaces $g_0$, the second logic block replaces $g_1$ and $g_{N-K} = g_2 = I$, the identity element of the field.

However, although this approach is quite general, it should be noted that the more widely the elements to be tested are separated, the more awkward are the timing constraints and the greater the order of G(X) that is required and the more expensive will be the apparatus in relation to its effectiveness and the more chance is there that an apparent error can result from malfunction of the tester rather than from malfunction of that which is being tested. It is thought to be desirable that, if the apparatus is to be built into the data processing circuitry containing the logic blocks to be tested that isolating gates be incorporated by means of which (a) a block being tested can be logically isolated from the surrounding circuitry; and (b) the surrounding apparatus can be caused to ignore the fact that various parts have apparently disappeared. Normally such apparatus, when built it, will be run under program control in the context of diagnostic and monitoring programs of which may abound. Thus the input on line 20 may not only contain an actuating signal but may also define D for the test and may also redefine D for a subsequent test (but remember that the testing apparatus will have to be reset between tests).

Figure 2:
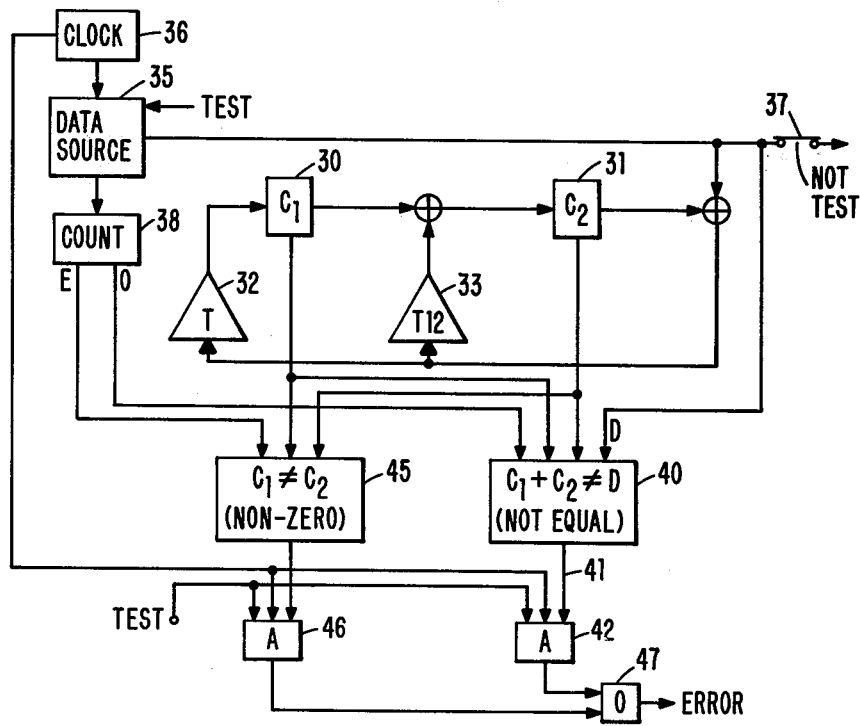
FIG. 2 is a diagramatic drawing of one specific preferred implementation of the invention.

Referring to FIG. 2, the invention is shown as being implemented for an error correcting apparatus which generates two syndromes respectively in registers 30 and 31 the syndromes being labeled C1 and C2. A pair of multipliers 32 and 33 are connected in the usual manner for cooperating with the syndrome generators. The syndrome generators in a preferred form are shift registers; however, they can be logic apparatus which includes programmable logic arrays, and can be a computer program. A data source 35 supplies data to the apparatus for error checking. Under a test mode, predetermined test bits of any combination can be used to test the apparatus in accordance with the invention. A clock 36 times the operation of the data source with the error correcting apparatus as well as the data sync (not shown). A switch 37 during test decouples the error correcting apparatus from the data sync (not shown). The data source also supplies the signal to a modulo two counter 38 for keeping track of even and odd cycles of the test. The clock 36 also supplies timing signals to the apparatus as will become apparent.

During each odd cycle, the modulo two counter 38 supplies an enabling signal to equality detecting circuit 40.

Circuit 40 detects the equality between the signal contents of registers 30 and 31. If they are not equal, an enabling signal is supplied over line 41 to and circuit 42 for signaling an error condition and circuit 42 is also enabled by the test mode and by the timing signal from clock 36.

On the even cycles, the non-zero detecting circuit 45 receives a signal from C1 and C2. If C1 does not equal C2, then an alarm is sounded via circuit 46 and/or circuit 47, and circuit 46 is constructed in the same manner as AND circuit 42.

While the invention has been particularly shown and described with reference to preferred embodiments thereof, it will be understood by those skilled in the art that various changes in form and details may be made therein without departing from the spirit and scope of the invention.

What is claimed is:

1. The method of testing logic apparatus embodying a polynomial equation as a design base, the steps of:
   repeatedly supplying a given set of test bits to said apparatus,
   upon predetermined ones of said repeated supply of test bits, extract the signal contents from said apparatus,
   if such one repeated supply is an even numbered repetition, check said extracted signals for a sum of zero,
   if such one repeated supply is an odd numbered repetition, check said extracted signals for an equality with said test bits, and
   signal an error condition upon a failure of said check.

2. The method of claim 1 including
   selecting said predetermined repeated repetitions to include both an odd and an even repetition.

3. The method of claim 1 including checking during each and every one of said repeated supply of test bits.

4. The method of claim 3, further including the steps of:
   simultaneously testing a plurality of units in said apparatus,
   during said even cycles testing for zero by modulo two comparing signal contents of all units, and
   during said odd cycles testing for equality by modulo two summing the signal contents of all units for comparison with said test bits.

5. The method set forth in claim 4 wherein said apparatus embodies a polynomial expressable in a Galois Field, said units in said apparatus exhibiting a shift property and during each such repeated supply of test bits also shift signal contents of said units in accordance with said polynomial.

6. Error correction apparatus having a plurality of syndrome generators and means interconnecting said syndrome generators, and embodying a polynomial in a Galois Field, characterized in that:

means connected to said plurality of syndrome generators for supply digital signals thereto for enabling generation of predetermined repetitive patterns alternately yielding zero and non-zero signal contents therein, first logic means connected to said plurality of syndrome generators to test said syndrome generators for signal contents representing zero, second logic means connected to said plurality of syndrome generators to test said syndrome generators for a signal content equal to a predetermined number, both said logic means including modulo-2 operative circuits, and control means connected to said logic means for alternatively actuating same.

7. Error correction as set forth in claim 6, further including, modulo-two counter means in said control means for indicating odd and even cycles of operation of said plurality of syndrome generators, and said control means actuating said first and second logic means during said even and odd cycles of operation, respectively.

* * * * *